US008898349B1

(12) United States Patent
Mondal et al.

(10) Patent No.: US 8,898,349 B1
(45) Date of Patent: Nov. 25, 2014

(54) IPMI OVER USB DATA TRANSFER BETWEEN HOST COMPUTER AND BASEBOARD MANAGEMENT CONTROLLER (BMC)

(71) Applicant: American Megatrends, Inc., Norcross, GA (US)

(72) Inventors: Umasankar Mondal, Snellville, GA (US); Jay Pancholi, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 14/050,424

(22) Filed: Oct. 10, 2013

(51) Int. Cl.
*G06F 3/00* (2006.01)
*G06F 13/36* (2006.01)
*G06F 11/30* (2006.01)

(52) U.S. Cl.
CPC .................................. *G06F 11/3068* (2013.01)
USPC ................................ 710/16; 710/15; 710/315

(58) Field of Classification Search
None
See application file for complete search history.

(56) References Cited

U.S. PATENT DOCUMENTS 8,069,257 B1 * 11/2011 Bhatia et al. .................. 709/230

* cited by examiner

*Primary Examiner* — Idriss N Alrobaye
*Assistant Examiner* — David Martinez
(74) *Attorney, Agent, or Firm* — Morris Manning & Martin, LLP; Tim Tingkang Xiak, Esq.

(57) ABSTRACT

Certain aspects direct to data transfer between a baseboard management controller (BMC) and a host computer. When the BMC is connected to the host computer via a universal serial bus (USB) interface, the BMC sends USB descriptors to the host computer such that the host computer recognizes the BMC as a specific human interface device (HID) device based on the USB descriptors. To transfer data to the host computer, the BMC converts the data to an Intelligent Platform Management Interface (IPMI) message, and generates a USB HID report containing the IPMI message as the report data. The BMC then sends the USB HID report to the host computer through the USB interface. When the BMC receives a USB HID report from the host computer, the BMC retrieves the report data, which is an IPMI message, from the USB HID report, and process the IPMI message to obtain the data.

25 Claims, 6 Drawing Sheets

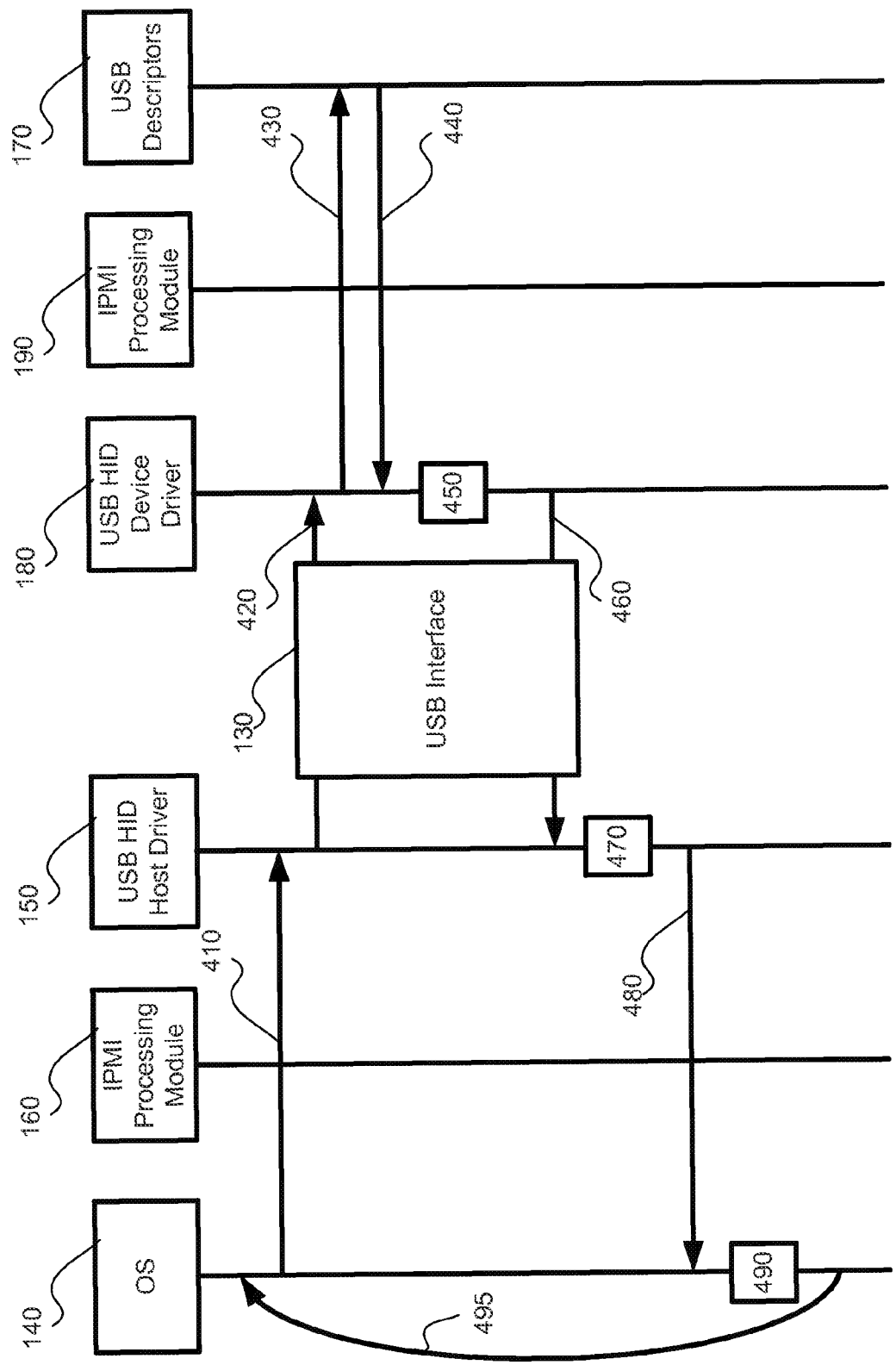

IPMI OVER USB DATA TRANSFER BETWEEN HOST COMPUTER AND BASEBOARD MANAGEMENT CONTROLLER (BMC)

FIELD

The present disclosure relates generally to data transfer between a host computer and a baseboard management controller (BMC), and particularly to data transfer between a host computer and a BMC using the universal serial bus (USB) interface under the Intelligent Platform Management Interface (IPMI) architecture of the BMC.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

IPMI is an industry standard for system monitoring and event recovery. Currently, BMC chips fully support the IPMI Specification version 2.0 (hereinafter the IPMI v2.0), which is publicly available from INTEL CORPORATION, and is incorporated herein by reference. The IPMI v2.0 provides a common message-based interface for accessing all of the manageable features in a compatible computer.

Under the IPMI architecture, the Intelligent Platform Management Bus (IPMB) communications protocol defines a byte-level transport for transferring IPMI messages. Further, IPMI defines three types of standardized system interface that the system software uses for transferring IPMI messages to the BMC. The three IPMI system interfaces include the keyboard controller style (KCS) interface, the system management interface chip (SMIC) interface, and the block transfer (BT) interface.

In addition to the system interfaces and IPMB, IPMI messaging can be carried over other interfaces such as a local area network (LAN), serial/modem interface, Intelligent Chassis Management Bus (ICMB), and peripheral component interconnect (PCI) management bus. IPMI includes a communication infrastructure that supports transferring messages between these interfaces as well as to the BMC.

Currently, BMC vendors use BMC hardware which supports at least one of the system interfaces as described above. With tremendous growth of cloud infrastructure and low cost server market evolution, BMC vendors are seeking solutions to provide the BMC with a low cost alternative to the system interfaces and a method of transferring IPMI messages from the host to the BMC in a faster way.

Therefore, an unaddressed need exists in the art to address the aforementioned deficiencies and inadequacies.

SUMMARY

Certain aspects of the present disclosure direct to a system. In certain embodiments, the system includes a baseboard management controller (BMC). The BMC includes a processor, a non-volatile memory and a universal serial bus (USB) interface. The non-volatile stores firmware, a plurality of USB descriptors, and a USB human interface device (HID) device driver. The firmware, when executed at the processor, is configured to: when the BMC is connected to a host computer via the USB interface, send the plurality of USB descriptors to the host computer through the USB interface such that the host computer recognizes the BMC as a specific HID device based on the plurality of USB descriptors; instruct the USB HID device driver to generate a first USB HID report in a predefined format based on the USB descriptors, wherein the predefined format comprises a USB header, report data, and a USB footer; generate a first Intelligent Platform Management Interface (IPMI) message as the report data of the first USB HID report; send the first USB HID report generated by the USB HID device driver to the host computer through the USB interface; receive a second USB HID report in the predefined format from the host computer through the USB interface; instruct the USB HID device driver to retrieve the report data from the second USB HID report, wherein the retrieved report data is a second IPMI message; and process the second IPMI message.

In certain embodiments, the USB header includes a synchronization field and a packet identifier field, and the USB footer includes a cyclic redundancy checking (CRC) field and an end of packet (EOP) field.

In certain embodiments, each of the first USB HID report and the second USB HID report includes at least one USB data packet.

In certain embodiments, the firmware is configured to send the plurality of USB descriptors to the host computer through the USB interface by: receiving a request for one of the USB descriptors from the host computer through the USB interface; and sending, in response to the request, the requested USB descriptor to the host computer through the USB interface.

In certain embodiments, the firmware is configured to receive the second USB HID report from the host computer through the USB interface by: receiving at least one USB data packet of the second USB HID report from the host computer through the USB interface; and instructing the USB HID device driver to combine the at least one USB data packet to generate the second USB HID report.

In certain embodiments, the firmware is configured to send the first USB HID report to the host computer through the USB interface by instructing the USB HID device driver to: generate at least one USB data packet from the first USB HID report; and send the at least one USB data packet of the first USB HID report to the host computer through the USB interface.

In certain embodiments, the host computer includes: a host processor; and a storage device. The storage device is configured to store an IPMI application, an operating system (OS), and a USB HID host driver. The IPMI application, when executed at the host processor, is configured to: generate the second IPMI message as the report data of the second USB HID report; send the second IPMI message to the OS; and receive and process the first IPMI message from the OS. The OS, when executed at the host processor, is configured to: when the BMC is connected to the host computer via the USB interface, receive the plurality of USB descriptors from the BMC through the USB interface, and recognize the BMC as the specific HID device to receive the second USB HID report based on the plurality of USB descriptors; receive the second IPMI message from the IPMI application; instruct the USB HID host driver to generate the second USB HID report from the second IPMI message in the predefined format based on the plurality of USB descriptors; send the second USB HID report generated by the USB HID host driver to the BMC through the USB interface; receive the first USB HID report from the BMC through the USB interface; and instruct the USB HID host driver to retrieve the first IPMI message from the first USB HID report and send the retrieved first IPMI message to the IPMI application.

In certain embodiments, the OS is configured to receive the plurality of USB descriptors to the host computer through the USB interface by: sending a request for one of the USB descriptors to the BMC through the USB interface; and receiving the requested USB descriptor from the BMC through the USB interface.

In certain embodiments, the USB descriptors include a device descriptor, at least one configuration descriptor, at least one interface descriptor, at least one endpoint descriptor, at least one HID descriptor, and at least one report descriptor.

In certain embodiments, the at least one interface descriptor includes a USB HID class code identifying the BMC as the specific HID device, and wherein the at least one report descriptor includes format codes identifying the predefined format.

In certain embodiments, the OS is configured to recognize the BMC as the specific HID device by: identifying the BMC as the specific HID device based on the USB HID class code of the at least one interface descriptor; and identifying the predefined format based on the format codes of the at least one report descriptor.

In certain embodiments, the OS is configured to receive the first USB HID report from the BMC through the USB interface by: receiving at least one USB data packet of the first USB HID report from the BMC through the USB interface; and instructing the USB HID host driver to combine the at least one USB data packet to generate the first USB HID report.

In certain embodiments, the OS is configured to send the second USB HID report to the BMC through the USB interface by instructing the USB HID host driver to: generate at least one USB data packet from the second USB HID report; and send the at least one USB data packet of the second USB HID report to the host computer through the USB interface.

Certain aspects of the present disclosure direct to a method of transferring data between a baseboard management controller (BMC) and a host computer. In certain embodiments, the method includes: sending, from the BMC, a plurality of universal serial bus (USB) descriptors to the host computer through a USB interface such that the host computer recognizes the BMC as a specific human interface device (HID) device based on the plurality of USB descriptors, wherein the BMC is connected to the host computer via the USB interface; instructing, at the BMC, a USB HID device driver to generate a first USB HID report in a predefined format based on the USB descriptors, wherein the predefined format comprises a USB header, report data, and a USB footer; generating, at the BMC, a first Intelligent Platform Management Interface (IPMI) message as the report data of the first USB HID report; sending, from the BMC, the first USB HID report generated by the USB HID device driver to the host computer through the USB interface; receiving, at the BMC, a second USB HID report in the predefined format from the host computer through the USB interface; instructing, at the BMC, the USB HID device driver to retrieve the report data from the second USB HID report, wherein the retrieved report data is a second IPMI message; and processing, at the BMC, the second IPMI message.

In certain embodiments, each of the first USB HID report and the second USB HID report includes at least one USB data packet.

In certain embodiments, the BMC is configured to send the plurality of USB descriptors to the host computer through the USB interface by: receiving a request for one of the USB descriptors from the host computer through the USB interface; and sending, in response to the request, the requested USB descriptor to the host computer through the USB interface. In certain embodiments, the BMC is configured to receive the second USB HID report from the host computer through the USB interface by: receiving at least one USB data packet of the second USB HID report from the host computer through the USB interface; and instructing the USB HID device driver to combine the at least one USB data packet to generate the second USB HID report. In certain embodiments, the BMC is configured to send the first USB HID report to the host computer through the USB interface by instructing the USB HID device driver to: generate at least one USB data packet from the first USB HID report; and send the at least one USB data packet of the first USB HID report to the host computer through the USB interface.

In certain embodiments, the host computer includes: a host processor; and a storage device. The storage device is configured to store an IPMI application, an operating system (OS), and a USB HID host driver. The IPMI application, when executed at the host processor, is configured to: generate the second IPMI message as the report data of the second USB HID report; send the second IPMI message to the OS; and receive and process the first IPMI message from the OS. The OS, when executed at the host processor, is configured to: when the BMC is connected to the host computer via the USB interface, receive the plurality of USB descriptors from the BMC through the USB interface, and recognize the BMC as the specific HID device to receive the second USB HID report based on the plurality of USB descriptors; receive the second IPMI message from the IPMI application; instruct the USB HID host driver to generate the second USB HID report from the second IPMI message in the predefined format based on the plurality of USB descriptors; send the second USB HID report generated by the USB HID host driver to the BMC through the USB interface; receive the first USB HID report from the BMC through the USB interface; and instruct the USB HID host driver to retrieve the first IPMI message from the first USB HID report and send the retrieved first IPMI message to the IPMI application.

In certain embodiments, the USB descriptors include a device descriptor, at least one configuration descriptor, at least one interface descriptor, at least one endpoint descriptor, at least one HID descriptor, and at least one report descriptor. In certain embodiments, the at least one interface descriptor includes a USB HID class code identifying the BMC as the specific HID device, and wherein the at least one report descriptor includes format codes identifying the predefined format.

In certain embodiments, the OS is configured to receive the plurality of USB descriptors to the host computer through the USB interface by: sending a request for one of the USB descriptors to the BMC through the USB interface; and receiving the requested USB descriptor from the BMC through the USB interface. In certain embodiments, the OS is configured to recognize the BMC as the specific HID device by: identifying the BMC as the specific HID device based on the USB HID class code of the at least one interface descriptor; and identifying the predefined format based on the format codes of the at least one report descriptor. In certain embodiments, the OS is configured to receive the first USB HID report from the BMC through the USB interface by: receiving at least one USB data packet of the first USB HID report from the BMC through the USB interface; and instructing the USB HID host driver to combine the at least one USB data packet to generate the first USB HID report. In certain embodiments, the OS is configured to send the second USB HID report to the BMC through the USB interface by instructing the USB HID host driver to: generate at least one USB data packet from the second USB HID report; and send the at least one USB data packet of the second USB HID report to the host computer through the USB interface.

Certain aspects of the present disclosure direct to a non-transitory computer readable medium storing computer executable codes. The codes, when executed at a processor, are configured to: send, from a baseboard management controller (BMC), a plurality of universal serial bus (USB) descriptors to a host computer through a USB interface such that the host computer recognizes the BMC as a specific human interface device (HID) device based on the plurality of USB descriptors, wherein the BMC is connected to the host computer via the USB interface; instruct, at the BMC, a USB HID device driver to generate a first USB HID report in a predefined format based on the USB descriptors, wherein the predefined format comprises a USB header, report data, and a USB footer; generate, at the BMC, a first Intelligent Platform Management Interface (IPMI) message as the report data of the first USB HID report; send, from the BMC, the first USB HID report generated by the USB HID device driver to the host computer through the USB interface; receive, at the BMC, a second USB HID report in the predefined format from the host computer through the USB interface; instruct, at the BMC, the USB HID device driver to retrieve the report data from the second USB HID report, wherein the retrieved report data is a second IPMI message; and process, at the BMC, the second IPMI message.

In certain embodiments, each of the first USB HID report and the second USB HID report includes at least one USB data packet.

In certain embodiments, the codes are configured to send, from the BMC, the plurality of USB descriptors to the host computer through the USB interface by: receiving a request for one of the USB descriptors from the host computer through the USB interface; and sending, in response to the request, the requested USB descriptor to the host computer through the USB interface. In certain embodiments, the codes are configured to receive, at the BMC, the second USB HID report from the host computer through the USB interface by: receiving at least one USB data packet of the second USB HID report from the host computer through the USB interface; and instructing the USB HID device driver to combine the at least one USB data packet to generate the second USB HID report. In certain embodiments, the codes are configured to send, from the BMC, the first USB HID report to the host computer through the USB interface by instructing the USB HID device driver to: generate at least one USB data packet from the first USB HID report; and send the at least one USB data packet of the first USB HID report to the host computer through the USB interface.

In certain embodiments, the host computer includes: a host processor; and a storage device. The storage device is configured to store an IPMI application, an operating system (OS), and a USB HID host driver. The IPMI application, when executed at the host processor, is configured to: generate the second IPMI message as the report data of the second USB HID report; send the second IPMI message to the OS; and receive and process the first IPMI message from the OS. The OS, when executed at the host processor, is configured to: when the BMC is connected to the host computer via the USB interface, receive the plurality of USB descriptors from the BMC through the USB interface, and recognize the BMC as the specific HID device to receive the second USB HID report based on the plurality of USB descriptors; receive the second IPMI message from the IPMI application; instruct the USB HID host driver to generate the second USB HID report from the second IPMI message in the predefined format based on the plurality of USB descriptors; send the second USB HID report generated by the USB HID host driver to the BMC through the USB interface; receive the first USB HID report from the BMC through the USB interface; and instruct the USB HID host driver to retrieve the first IPMI message from the first USB HID report and send the retrieved first IPMI message to the IPMI application.

In certain embodiments, the USB descriptors include a device descriptor, at least one configuration descriptor, at least one interface descriptor, at least one endpoint descriptor, at least one HID descriptor, and at least one report descriptor. In certain embodiments, the at least one interface descriptor includes a USB HID class code identifying the BMC as the specific HID device, and wherein the at least one report descriptor includes format codes identifying the predefined format.

In certain embodiments, the OS is configured to receive the plurality of USB descriptors to the host computer through the USB interface by: sending a request for one of the USB descriptors to the BMC through the USB interface; and receiving the requested USB descriptor from the BMC through the USB interface. In certain embodiments, the OS is configured to recognize the BMC as the specific HID device by: identifying the BMC as the specific HID device based on the USB HID class code of the at least one interface descriptor; and identifying the predefined format based on the format codes of the at least one report descriptor. In certain embodiments, the OS is configured to receive the first USB HID report from the BMC through the USB interface by: receiving at least one USB data packet of the first USB HID report from the BMC through the USB interface; and instructing the USB HID host driver to combine the at least one USB data packet to generate the first USB HID report. In certain embodiments, the OS is configured to send the second USB HID report to the BMC through the USB interface by instructing the USB HID host driver to: generate at least one USB data packet from the second USB HID report; and send the at least one USB data packet of the second USB HID report to the host computer through the USB interface.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein:

FIG. 4 schematically depicts configuration setup of the BMC as a specific HID device at a host computer according to certain embodiments of the present disclosure;

DETAILED DESCRIPTION

Figure 1:
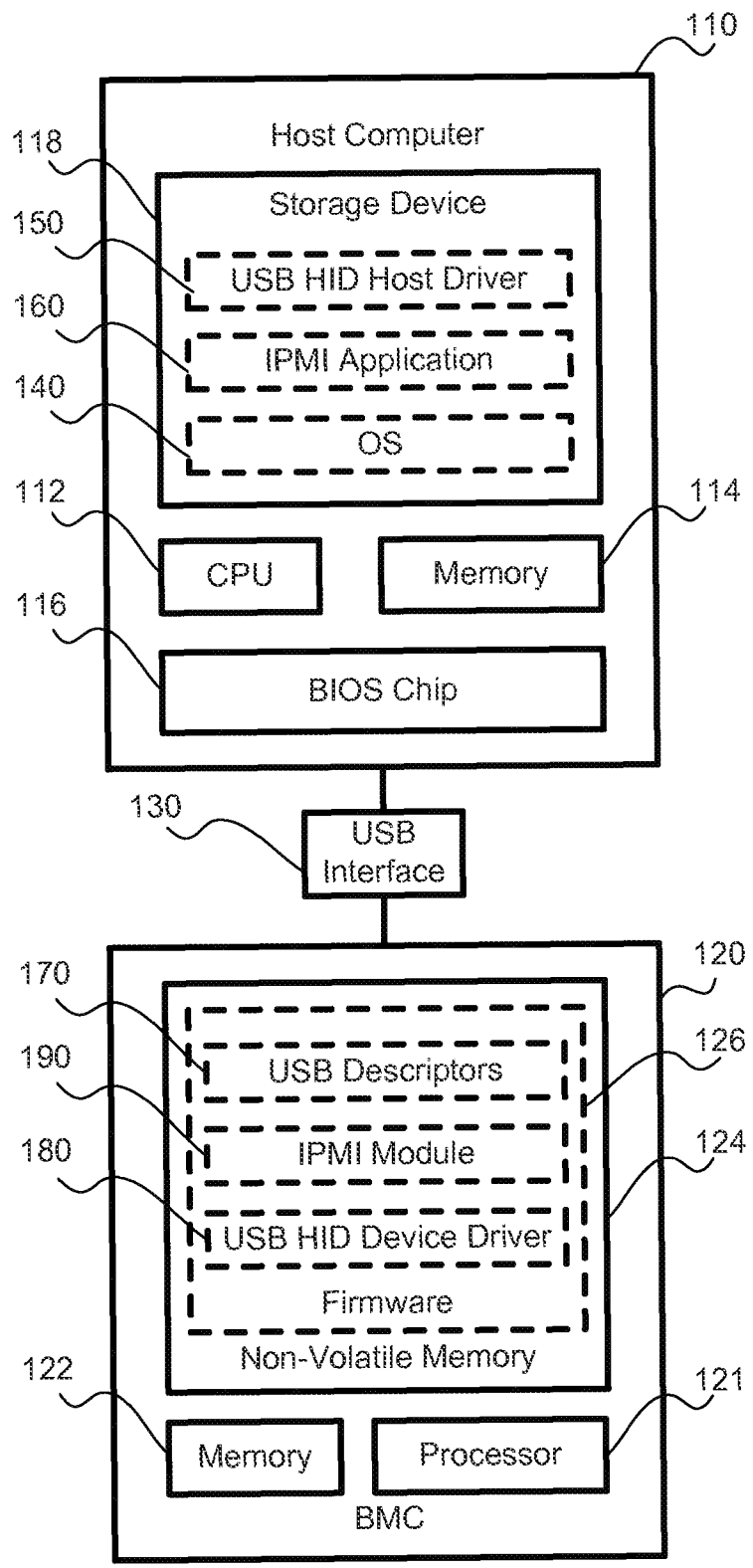
FIG. 1 schematically depicts a computer system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 schematically depicts a computer system according to certain embodiments of the present disclosure. As shown in FIG. 1, the computer system 100 includes a host computer 110 and a baseboard management controller (BMC) 120. The BMC 120 is connected to the host computer 110 via a universal serial bus (USB) interface 130.

In certain embodiments, the BMC 120 may be connected to the host computer 110 via more than one interface in addition to the USB interface 130. For example, the BMC 120 may be connected to the host computer 110 via one or more of the three typical standardized IPMI system interfaces, such as the KCS interface, the SMIC interface, or the BT interface. However, in some low cost BMC's, there may be no hardware/software support to the standardized IPMI system interfaces. For the purpose of the present disclosure, data transfer between the host computer 110 and the BMC 120 goes through the USB interface 130.

The host computer 110 may be a computing device, such as a general purpose computer or a headless computer. Generally, the host computer 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a central processing unit (CPU) 112, a memory 114, a BIOS chip 116, and other required memory and Input/Output (I/O) modules (not shown). In certain embodiments, the BMC 120 may also be a component on the baseboard. In certain embodiments, the CPU 112, the memory 114, and the BIOS chip 116 may be embedded on the baseboard, or may be connected to the baseboard through at least one interface. In certain embodiments, the interface may be physical hardware interface such as electrical connectors, buses, ports, cables, terminals, or other I/O devices.

Further, the host computer 110 includes a storage device 118, which stores a plurality of software applications, including an operating system (OS) 140, a USB human interface device (HID) host driver 150, and an IPMI application 160. In certain embodiments, the host computer 110 may include at least one I/O device (not shown) for generating and controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

The CPU 112 is a host processor which is configured to control operation of the host computer 110. The CPU 112 can execute the OS 140 or other applications of the host computer 110. In certain embodiments, the host computer 110 may run on or more than one CPU as the host processor, such as two CPUs, four CPUs, eight CPUs, or any suitable number of CPUs.

The memory 114 can be a volatile memory, such as the random-access memory (RAM), for storing the data and information during the operation of the host computer 110.

The BIOS chip 116 is one of the most crucial components in the host computer 110 or any computer system. In certain embodiments, the BIOS chip 116 is a non-volatile memory, such as a flash memory chip, an electrically erasable programmable read-only memory (EEPROM) chip or a complementary metal oxide semiconductor (CMOS) memory.

The BIOS chip 116 stores BIOS codes (not shown, hereinafter the BIOS). The BIOS is configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the OS 140.

The storage device 118 is a non-volatile data storage media for storing the OS 140, the USB HID host driver 150, the IPMI application 160, and other applications of the host computer 110. Examples of the storage device 118 may include flash memory, memory cards, USB drives, hard drives, floppy disks, optical drives, or any other types of data storage devices.

The OS 140 can be collective management software managing the operation of the host computer 110. For example, the OS 140 can include a set of functional programs that control and manage operations of the devices connected to the host computer 110. The set of application programs provide certain utility software for the user to manage the host computer 110. In certain embodiments, the OS 140 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, the OS 140 is compatible to the IPMI architecture for generating IPMI messages in order to communicate with the BMC 120.

In certain embodiments, when the BMC 120 is connected to the host computer 110 via the USB interface 130, the OS 140 is in charge to recognize the BMC 120 as a specific HID device. Specifically, the OS 140 requests and receives the USB descriptors 170 from the BMC 120 through the USB interface 130. Based on information of the USB descriptors 170, the OS may recognize the BMC 120 as the specific HID device, and recognize a predefined format of a USB HID report for transferring data to the specific HID device (i.e. the BMC 120). Details of the USB descriptors 170 and the predefined format will be explained later.

In certain embodiments, the OS 140 is configured to generate data to be transferred to the BMC 120, and sends the data to the IPMI application 160. After the IPMI application generates IPMI messages from the data, the OS 140 receives the IPMI messages generated by the IPMI application 160. Then, the OS 140 sends the IPMI messages to the USB HID host driver 150, and instructs the USB HID host driver 150 to generate a USB HID report from each of IPMI messages. The USB HID report is in the predefined format based on the information of the USB descriptors 170. After the USB HID host driver 150 generates the USB HID report, the OS 140 controls the USB HID host driver 150 to send the USB HID report to the BMC 120 through the USB interface 130. Details of the USB HID report will be described later.

In certain embodiments, when the host computer 110 receives a USB HID report from the BMC 120 through the USB interface 130, the OS 140 instructs the USB HID host driver 150 to retrieve the IPMI message embedded in the first USB HID report. Then the OS 140 sends the retrieved IPMI message to the IPMI application 160 for processing. After the IPMI application 160 processes the IPMI messages to generate data recognizable by the OS 140, the IPMI application 160 sends the data back to the OS 140 such that the OS 140 may process with the data from the BMC 120.

The USB HID host driver 150 is a computer program that operates or controls the USB HID data transfer to and from HID devices attached to the host computer 110 via the USB interface 130. The USB HID host driver 150 is instructed by the OS 140 to communicate with any USB HID devices through the USB interface 130.

For USB HID devices, data transfer is implemented by USB HID reports (hereinafter the reports). A report is a data structure defined by the USB HID Specification. In actual data transfer, a report is converted to one or more USB data packets. Generally, when the OS 140 sends data to the USB HID host driver 150 for transferring the data to a particular HID device, the OS 140 will instruct the USB HID host driver 150 to generate a report in a format recognizable by the particular HID device. After generating the report, the USB HID host driver 150 converts the report to the USB data packets such that the OS 140 may send the USB data packets to the particular HID device through USB connection. For example, as discussed above, based on the information of the USB descriptors 170, the OS 140 may recognize the BMC 120 as the specific HID device, and recognize a predefined format of the report for transferring data to the BMC 120 as the specific HID device. Thus, when the OS 140 intends to send the IPMI messages to the BMC 120, the OS 140 sends the IPMI messages to the USB HID host driver 150, and instructs the USB HID host driver 150 to generate a report in the predefined format recognizable by the BMC 120. After generating the report, the USB HID host driver 150 converts the report to the USB data packets such that the OS 140 may send the USB data packets to the BMC 120 through the USB interface 130.

On the other hand, when the host computer 110 receives USB data packets from a particular HID device, the OS 140 instructs the USB HID host driver 150 to combine USB data packets to generate the report. Then, the OS 140 instructs the USB HID host driver 150 to retrieve data from the report based on a format defined by the particular HID device. For example, when the host computer 110 receives USB data packets from the BMC 120, which serves as the specific HID device, the OS 140 instructs the USB HID host driver 150 to combine the USB data packets to generate the report. Since the report is in the predefined format recognizable by the BMC 120, the OS 140 instructs the USB HID host driver 150 to retrieve the IPMI message from the report based on the predefined format.

In certain embodiments, data transfer under the HID class has a maximum packet size rate for full speed transfer at 64 bytes/ms. A typical IPMI message may be shorter than 64 bytes. In this case, a report generated from the IPMI message by the USB HID host driver 150 can be essentially a USB data packet, and there is no need for further converting the report to USB data packets. Specifically, the USB HID host driver 150 may embed the IPMI message directly with a packet header and a packet footer to form the single packet report. In other words, the report or the packet is formed by attaching the packet header at the front of the IPMI message, and attaching the packet footer at the end of the IPMI message.

As discussed above, the USB HID host driver 150 operates under the instruction issued by the OS 140. In certain embodiments, the USB HID host driver 150 may process the IPMI messages or any data to generate reports according to the predefined format. Thus, there is no need for the USB HID host driver 150 to change the codes or software modules to be compatible to the IPMI architecture. In other words, the USB HID host driver 150 may maintain its original USB processing functionalities without recognizing that the data to be processed to generate the reports includes IPMI messages.

Currently, almost all operating systems available in the market are compatible to the USB standard, and provide a variety of USB HID host drivers. In certain embodiments, the host computer 110 may use one of the USB HID host drivers provided by the OS 140 as the USB HID host driver 150. In certain embodiments, the host computer 110 may use a customized USB HID host driver 150, which is separated from the OS 140.

The IPMI application 160 is a computer program that generates and processes IPMI messages. In certain embodiments, when the OS 140 generates data to be transferred under the IPMI architecture, the OS 140 may send the data to the IPMI application 160, and the IPMI application converts the data to IPMI messages. When the OS 140 receives IPMI messages from the BMC 120 or any other peripheral devices, the OS 140 sends the received IPMI messages to the IPMI application 160. The IPMI application 160 processes the IPMI messages to generate data recognizable by the OS 140, and then sends the data back to the OS 140 for further process.

In certain embodiments, the IPMI application 160 is separated from the OS 140 as an independent program. In certain embodiments, the IPMI application 160 can be a part of the OS 140, which is compatible to the IPMI architecture for generating IPMI messages.

As discussed above, the IPMI application 160 performs conversion between IPMI messages and data recognizable by the OS 140. In certain embodiments, the IPMI application 160 is independent from the USB features of the host computer 110. Thus, the IPMI application 160 does not need to change the codes or software modules to be compatible to the USB standard. In other words, the IPMI application 160 may maintain its original IPMI processing functionalities without adding features compatible to the USB standard.

The USB interface 130 is a standardized interface under the USB industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. The USB interface 130 has become commonplace on other devices, such as smartphones, PDAs and video game consoles. USB has effectively replaced a variety of earlier interfaces, such as serial and parallel ports, as well as separate power chargers for portable devices. Currently, USB allows bi-directional communications between the host computer 110 and the USB devices, as USB 3.0 allows for device-initiated communications towards the host.

The functionality of USB devices is defined by class codes, communicated to the USB host to affect the loading of suitable software driver modules for each connected device. This provides for adaptability and device independence of the host to support new devices from different manufacturers. For example, class code 0x03h defines the USB HID device class (hereinafter the HID class). The HID class specifies a device class, or a type of computer hardware, for HIDs such as a keyboard, a mouse, a joystick or a game controller, and alphanumeric display devices.

Comparing to the IPMI data transfer, data transfer under the HID class has a maximum packet size rate for full speed transfer at 64 bytes/ms, which completely satisfies the IPMI message and IPMB or Private Bus Transaction size requirements specified by IPMI v2.0. Further, the maximum packet size rate under the HID class is faster than the byte-level data transfer via the typical standardized IPMI system interfaces, such as the KCS interface, the SMIC interface, or the BT interface.

The USB HID class specifications allow for myriad other devices under the HID class. Some examples are automobile simulation controllers, exercise machines, telephony devices, thermometers, audio controls and medical instrumentation. In certain embodiments, a device without human interface may also declare itself under the HID class. For example, uninterruptible power supplies may declare themselves under this class, despite the fact they often have no human interface at all. In other words, any device can be a HID class device as long as a designer meets the HID class logical specifications and declare itself under the HID class.

USB device communication is based on pipes (logical channels). A pipe is a connection from the host controller at the host computer 110 to a logical entity found on a USB device. The logical entity is generally named an "endpoint." Because pipes correspond 1-to-1 to endpoints, the terms are sometimes used interchangeably. A USB device has a default endpoint zero, and could have up to 32 endpoints. Of the 32 endpoints, 16 are IN (meaning data transaction is from the USB device to the host) and 16 are OUT (data transaction from the host to the USB device). An endpoint is defined and numbered by the device during initialization (the period after physical connection called "enumeration") and so is relatively permanent, whereas a pipe may be opened and closed.

There are two types of pipes: stream and message pipes. A message pipe is bi-directional and is used for control transfers. Message pipes are typically used for short, simple commands to the device, and a status response, used, for example, by the bus control pipe number zero, which corresponds to the endpoint zero. A stream pipe is a uni-directional pipe connected to a uni-directional endpoint that transfers data using an isochronous, interrupt, or bulk transfer. Generally, a USB HID device requires one control endpoint (which can be endpoint zero) and one IN interrupt endpoint.

An endpoint of a pipe is addressable with a tuple (device_address, endpoint_number) as specified in a TOKEN packet that the host sends when it wants to start a data transfer session. If the direction of the data transfer is from the host to the endpoint, an OUT packet (a specialization of a TOKEN packet) having the desired device address and endpoint number is sent by the host. If the direction of the data transfer is from the device to the host, the host sends an IN packet instead. If the destination endpoint is a uni-directional endpoint whose manufacturer's designated direction does not match the TOKEN packet (e.g., the manufacturer's designated direction is IN while the TOKEN packet is an OUT packet), the TOKEN packet is ignored. Otherwise, it is accepted and the data transaction can start. A bi-directional endpoint, on the other hand, accepts both IN and OUT packets.

Information about a USB device is stored in segments of the non-volatile memory, such as a read-only memory (ROM), of the USB device. These segments are called descriptors. All USB devices have a hierarchy of descriptors which describe to the host information such as what the device is, who makes it, what version of USB it supports, how many ways it can be configured, the number of endpoints and their types, and other information of the USB devices. Common USB and HID related descriptors include device descriptors, configuration descriptors, interface descriptors, endpoint descriptors, HID descriptors and report descriptors. All descriptors are made up of a common format. The first byte of the descriptor is a bLength field, which specifies the length (in bytes) of the descriptor. The second byte of the descriptor is a bDescriptorType field, which indicates the descriptor type. For example, 0x01 refers to a device descriptor, 0x02 refers to a configuration descriptor, 0x04 refers to an interface descriptor, 0x05 refers to an endpoint descriptor, and 0x21 refers to a HID descriptor. If the length of a descriptor is smaller than what the specification defines, then the host shall ignore it. However, if the size of a descriptor is greater than expected, the host will ignore the extra bytes and start looking for the next descriptor at the end of actual length returned. Examples of the descriptors will be described later.

The BMC 120 is a specialized microcontroller that manages the interface between system management software and platform hardware. In certain embodiments, the BMC 120 may be a service processor (SP). Different types of sensors can be built into the host computer 110, and the BMC 120 reads these sensors to obtain parameters such as temperature, cooling fan speeds, power status, OS status, etc.

The BMC 120 monitors the sensors and can send out-of-band (OOB) alerts to a system administrator of the host computer 110 if any of the parameters do not stay within preset limits, indicating a potential failure of the host computer 110. In certain embodiments, the administrator can also remotely communicate with the BMC 120 from a remote management computer via a network to take remote action to the host computer. For example, the administrator may reset the host computer 110 from the remote management computer through the BMC 120, and may obtain system information of the host computer 110 OOB without interrupting the operation of the host computer 110.

As shown in FIG. 1, the BMC 120 includes a processor 121, a memory 122 and a non-volatile memory 124. In certain embodiments, the BMC 120 may include other components, such as at least one I/O device (not shown).

The processor 121 is a BMC processor configured to control operation of the BMC 120. The processor 121 can execute the firmware 126 or other codes stored in the BMC 120. In certain embodiments, the BMC 120 may run on or more than one processor.

The memory 122 can be a volatile memory, such as the RAM, for storing the data and information during the operation of the BMC 120.

The non-volatile memory 124 stores the firmware 126 of the BMC 120. As shown in FIG. 1, the firmware 126 of the BMC 120 includes, among other things, USB descriptors 170, a USB HID device driver 180, and an IPMI module 190. In certain embodiments, the firmware 126 may include a web connection module (not shown) for communication with the network such that an administrator of the computer system may connect to the BMC 120 remotely from the remote management computer via the network.

The USB descriptors 170 refer to a collection of descriptors to define the BMC 120 as a USB HID device. As discussed above, common USB and HID related descriptors include device descriptors, configuration descriptors, interface descriptors, endpoint descriptors, HID descriptors and report descriptors. All descriptors are made up of a common format.

Figure 2:
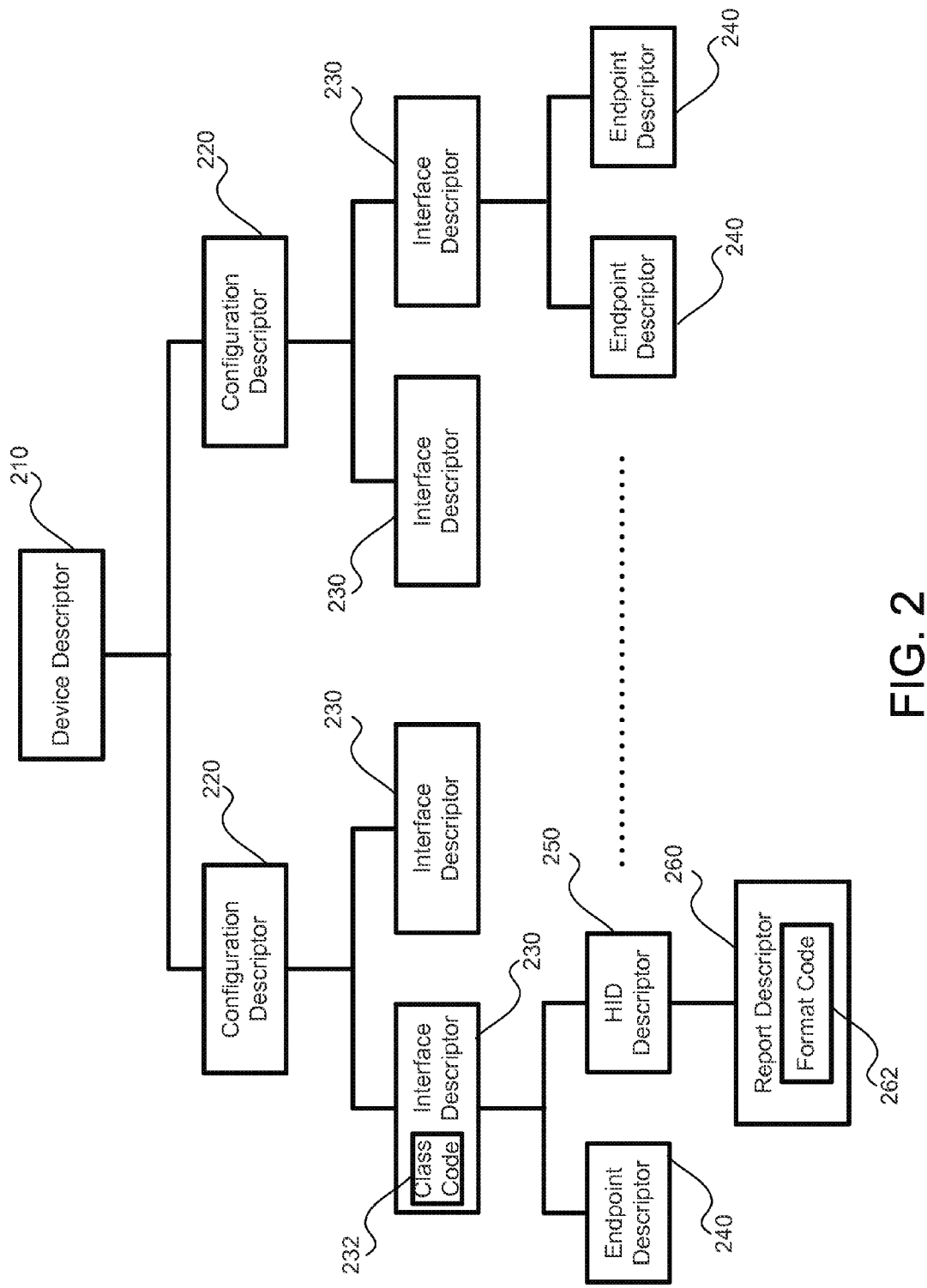
FIG. 2 schematically depicts a descriptor hierarchy of the BMC as a specific HID device according to certain embodiments of the present disclosure.

FIG. 2 schematically depicts a descriptor hierarchy of the BMC as a specific HID device according to certain embodiments of the present disclosure. As shown in FIG. 2, for each USB HID device, such as the BMC 120, the descriptor hierarchy includes one device descriptor 210, followed by one or more configuration descriptors 220. Each configuration descriptor 220 may be followed by one or more interface descriptors 230. Each interface descriptor 230 may be followed by one or more endpoint descriptors 240 and one or more HID descriptors 250. Each HID descriptor 250 is followed by a report descriptor 260.

The device descriptor 210 of a USB device represents the entire device. Thus, a USB device, such as the BMC 120, can only have one device descriptor 210. The device descriptor 210 specifies the basic yet important information about the USB device such as the supported USB version, maximum packet size, vendor and product IDs and the number of possible configurations the device can have.

In certain embodiments, for the BMC 120, the device descriptor 210 can be a 12 to 18 bytes descriptor. The first byte (offset 0) of the device descriptor 210 is a bLength field, which specifies the length of the descriptor (for example, 0x12 indicates that the length of the device descriptor 210 is 12 bytes). The second byte (offset 1) of the device descriptor 210 is a bDescriptorType field, which indicates the descriptor type (0x01). The fifth byte of the device descriptor 210 is a bDeviceClass field, and the sixth byte of the device descriptor 210 is a bDeviceSubClass field. The bDeviceClass and bDeviceSubClass fields respectively indicate the device class code and subclass code assigned by the USB. It should be noted that for a USB HID device, the HID class is not defined in the bDeviceClass field of device descriptor 210, and the bDeviceClass field is generally assigned the value of 0x00. The eighth byte of the device descriptor 210 is a bMaxPacketSize0 field, which indicates the maximum packet size for endpoint zero. Only 8, 16, 32 and 64 are valid values for the bMaxPacketSize0 field. For example, 0x64 indicates the maximum packet size of endpoint zero of the USB device is 64 bytes. Definitions and sample values of other fields of the device descriptor 210 can be found in the USB Specification, and are not hereinafter described in detail.

As discussed above, the bMaxPacketSize0 field of the device descriptor 210 indicates the maximum packet size for endpoint zero. In certain embodiments, the bMaxPacketSize0 field of the device descriptor 210 may include the value 0x64 to indicate the maximum packet size for endpoint zero as 64 bytes. When the OS 140 of the host computer 110 receives the device descriptor 210, the OS 140 may interpret the value 0x64 stored in the bMaxPacketSize0 field of the device descriptor 210, and recognize the maximum packet size for endpoint zero of the BMC 120 to be 64 bytes.

The configuration descriptor 220 specifies the configuration of the USB device, such as how the USB device is powered, what the maximum power consumption is, and the number of interfaces it has. Typically, each USB device has one configuration descriptor 220. In certain embodiments, a USB device can have several different configuration descriptors 220 to indicate different configurations of the USB device. In certain embodiments, the BMC 120, which serves as a USB HID device, may have one or more configuration descriptors 220.

In certain embodiments, for the BMC 120, the configuration descriptor 220 can be a 9-byte descriptor. The first byte (offset 0) of the configuration descriptor 220 is a bLength field, which specifies the length of the descriptor (for example, 0x09 indicates that the length of the configuration descriptor 220 is 9 bytes). The second byte (offset 1) of the configuration descriptor 220 is a bDescriptorType field, which indicates the descriptor type (0x02). The third and fourth bytes (offset 2) of the configuration descriptor 220 constitute a 2-byte wTotalLength field, which indicates the total combined length of all returned descriptors (including the configuration descriptor 220 itself, the one or more interface descriptors 230, the one or more endpoint descriptors 240 and the one or more HID descriptors 250) under the configuration. The fifth byte (offset 4) of the configuration descriptor 220 is a bNumInterfaces field, which indicates the number of interfaces supported by the configuration. Definitions and sample values of other fields of the configuration descriptor 220 can be found in the USB Specification, and are not hereinafter described in detail.

The interface descriptor 230 indicates the functions of an interface, which is formed by one or more endpoints as a group. In other words, the interface descriptor 230 is essentially a header or grouping of the endpoints into a functional group performing a single feature of the USB device. The interface descriptor 230 is also the descriptor for identifying a USB device as belonging to one of a finite number of classes, such as the HID class. A USB/HID class device uses a corresponding HID class device driver to retrieve and route all data. In certain embodiments, the BMC 120, which serves as a USB HID device, may have one or more interface descriptors 230.

In certain embodiments, for the BMC 120, the interface descriptor 230 can be a 9-byte descriptor. The first byte (offset 0) of the interface descriptor 230 is a bLength field, which specifies the length of the descriptor (for example, 0x09 indicates that the length of the interface descriptor 230 is 9 bytes). The second byte (offset 1) of the interface descriptor 230 is a bDescriptorType field, which indicates the descriptor type (0x04). The fifth byte (offset 4) of the interface descriptor 230 is a bNumEndpoints field, which indicates the number of endpoints used by the interface. The sixth byte (offset 5) of the interface descriptor 230 is a bInterfaceClass field, which indicates the class code assigned by the USB. For example, 0x03 indicates that the interface is in the HID class. Definitions and sample values of other fields of the interface descriptor 230 can be found in the USB Specification, and are not hereinafter described in detail.

As discussed above, the bInterfaceClass field of the interface descriptor 230 is used to indicate the class code of the BMC 120. Thus, the bInterfaceClass field 232 of the interface descriptor 230 includes the value 0x03 of the USB HID class code to identify the BMC 120 as the specific HID device. When the OS 140 of the host computer 110 receives the interface descriptor 230, the OS 140 may interpret the value 0x03 of the USB HID class code stored in the bInterfaceClass field 232 of the interface descriptor 230, and recognize the BMC 120 as the specific HID device.

The endpoint descriptor 240 is used to describe an endpoint other than endpoint zero. The endpoint zero is always assumed to be a control endpoint and is configured before any descriptors are even requested. The host will use the information returned from these descriptors to determine the bandwidth requirements of the bus. In certain embodiments, the BMC 120, which serves as a USB HID device, may have one or more endpoint descriptors 240 to define one or more endpoints other than endpoint zero.

In certain embodiments, the endpoint descriptor 240 can be a 7-byte descriptor. The first byte (offset 0) of the endpoint descriptor 240 is a bLength field, which specifies the length of the descriptor (for example, 0x07 indicates that the length of the endpoint descriptor 240 is 7 bytes). The second byte (offset 1) of the endpoint descriptor 240 is a bDescriptorType field, which indicates the descriptor type (0x05). The third byte (offset 2) of the endpoint descriptor 240 is a bEndpointAddress field, which describes the address of the endpoint on the USB device. The bits 0-3 of the bEndpointAddress field indicate the endpoint number, and the bit 7 of the bEndpointAddress field indicates the direction of the endpoint (0 for an OUT endpoint, and 1 for an IN endpoint), which is ignored for a bi-directional control endpoint. For example, 10000001B indicates that the endpoint number 1 is an IN endpoint. The fourth byte (offset 3) of the endpoint descriptor 240 is a bmAttributes field, which indicates the attributes of the endpoint. The bits 0-1 of the bmAttributes field show the transfer type of the endpoint, where 00 indicates control transfer, 01 indicates isochronous transfer, 10 indicates bulk transfer, and 11 indicates interrupt transfer. number of endpoints used by the interface. The sixth byte (offset 5) of the interface descriptor 230 is a bInterfaceClass field, which indicates the class code assigned by the USB. For example, 0x03 indicates that the interface is in the HID class. Definitions and sample values of other fields of the endpoint descriptor 240 can be found in the USB Specification, and are not hereinafter described in detail.

The HID descriptor 250 identifies the basic information of the HID device and the related descriptors, such as the report descriptor 260, for describing the HID device. In other words, the HID descriptor 250 is essentially a header of the report descriptor 260 of the HID device. The HID Class Specification allows implementation of self-describing input devices, which means the HID descriptor 250 and its corresponding report descriptor 260 may contain information to understand the report protocol the HID device uses to send information. In certain embodiments, the BMC 120, which serves as a USB HID device, may have one or more HID descriptor 250 to define the basic information of the BMC 120 as the HID device.

In certain embodiments, the HID descriptor 250 can be a 9-byte descriptor. The first byte (offset 0) of the HID descriptor 250 is a bLength field, which specifies the length of the descriptor (for example, 0x09 indicates that the length of the HID descriptor 250 is 7 bytes). The second byte (offset 1) of the HID descriptor 250 is a bDescriptorType field, which indicates the descriptor type (0x21). The sixth byte (offset 5) of the HID descriptor 250 is a bNumDescriptors field, which indicates the number of HID class descriptors (such as the report descriptor 260) to follow. Each HID descriptor 250 must be followed by at least one report descriptor 260, so the value of the bNumDescriptors field must be at least one. For example, if the HID descriptor 250 is followed by a report descriptor 260 and no other HID class descriptors, the value of the bNumDescriptors field is 0x01. The seventh byte (offset 6) of the HID descriptor 250 is a bDescriptorType field, which indicates the type of the report descriptor 260. The eighth and ninth bytes (offset 7) of the HID descriptor 250 constitute a wItemLength field, which indicates the total length of the report descriptor 260. Definitions and sample values of other fields of the HID descriptor 250 can be found in the HID Class Specification, and are not hereinafter described in detail.

The report descriptor 260 is the header of a report of the HID device, identifying the format of data transferred by the HID device. Since data is transferred in packets, the report descriptor 260 defines the data packets, such as the size of the packet, and the purpose of each data bit in the packet.

When the BMC 120 device is connected to the host computer 110, the OS 140 of the host computer 110 reads the report descriptor 260 from the USB descriptors 170 for the report protocol defined therein. All data transfer between the host computer 110 and the HID device will follow the report protocol. Definitions and sample values of the report descriptor 260 can be found in the HID Class Specification, and are not hereinafter described in detail.

In certain embodiments, the BMC 120 can present itself to the host computer 110 as a specific HID device (e.g. a specific mouse or a specific keyboard). In this case, the BMC 120 may have one or more report descriptors 260 to define the format of data transferred between the host computer 110 and the BMC 120 as the specific HID device. In certain embodiments, the report descriptor 260 of the BMC 120 can include certain format codes 262. The format codes 262 include information to indicate a predefined format of the report used by the BMC 120. For example, the format codes 262 may define the report between the BMC 120 and the host computer to include an IPMI message directly embedded with a packet header at the front and a packet footer at the end to form the single packet report. When the OS 140 of the host computer 110 receives the report descriptor 260, the OS 140 may interpret the format codes 262 of the report descriptor 260, and recognize data to be transferred to or received from the BMC 120 in the predefined format based on the information provided by the format codes 262. Thus, the OS 140 may instruct the USB HID host driver 150 to generate reports in the predefined format.

The USB HID device driver 180 is a program that controls USB HID data transfer of the BMC 120 to and from the host computer 110, or any other USB devices connected to the BMC 120, via the USB interface 130. The USB HID device driver 180 is instructed by the firmware 126 to communicate with the host computer 110 or any other USB devices through the USB interface 130.

As discussed, for USB HID devices, data transfer is implemented by reports, and in actual data transfer, a report is converted to one or more USB data packets. When the firmware 126 sends data to the USB HID device driver 180 for transferring the data to the particular HID device, the firmware 126 instructs the USB HID device driver 180 to generate a report in a format recognizable by the particular HID device. After generating the report, the USB HID device driver 180 converts the report to the USB data packets such that the firmware 126 may send the USB data packets to the particular HID device through USB connection. For example, after the BMC 120 is connected to the host computer 110 via the USB interface 130, the BMC 120 presents itself as the specific HID device for the host computer 110. Thus, when the firmware 126 intends to send IPMI messages to the host computer 110, the firmware 126 sends the IPMI messages to the USB HID device driver 180, and instructs the USB HID device driver 180 to generate a report in the predefined format. After generating the report, the USB HID device driver 180 converts the report to the USB data packets such that the firmware 126 may send the USB data packets to the host computer 110 through the USB interface 130.

On the other hand, when the BMC 120 receives USB data packets from a particular HID device, the firmware 126 instructs the USB HID device driver 180 to combine USB data packets to generate the report. Then, the firmware 126 instructs the USB HID device driver 180 to retrieve data from the report based on a format defined by the particular HID device. For example, when the BMC 120 receives USB data packets from the host computer 110, the firmware 126 instructs the USB HID device driver 180 to combine the USB data packets to generate the report. Since the report is in the predefined format, the firmware 126 instructs the USB HID device driver 180 to retrieve the IPMI message from the report based on the predefined format.

In certain embodiments, data transfer under the HID class has a maximum packet size rate for full speed transfer at 64 bytes/ms. A typical IPMI message may be shorter than 64 bytes. In this case, a report generated from the IPMI message by the USB HID device driver 180 can be essentially a USB data packet, and there is no need for further converting the report to USB data packets. Specifically, the USB HID device driver 180 may embed the IPMI message directly with a packet header and a packet footer to form the single packet report. In other words, the report or the packet is formed by attaching the packet header at the front of the IPMI message, and attaching the packet footer at the end of the IPMI message.

As discussed above, the USB HID device driver 180 operates under the instruction issued by the firmware 126. In certain embodiments, the USB HID device driver 180 may process the IPMI messages or any data to generate reports according to the predefined format. Thus, there is no need for the USB HID device driver 180 to change the codes or software modules to be compatible to the IPMI architecture. In other words, the USB HID device driver 180 may maintain its original USB processing functionalities without recognizing that the data to be processed to generate the reports includes IPMI messages.

Currently, almost all firmware of BMC's available in the market supports the USB standard, and provide a variety of USB HID device drivers. In certain embodiments, the BMC 120 may use one of the USB HID device drivers provided by the firmware 126 as the USB HID device driver 180. In certain embodiments, the BMC 120 may use a customized USB HID device driver 180.

The IPMI module 190 is a program of the BMC 120 to generate and process IPMI messages. In certain embodiments, when the firmware 126 of the BMC 120 generates data to be transferred under the IPMI architecture, the firmware 126 sends the data to the IPMI module 190, and the IPMI module 190 converts the data to IPMI messages. When the firmware 126 receives IPMI messages from the host computer 110 or any other IPMI compatible devices, the firmware 126 sends the received IPMI messages to the IPMI module 190. The IPMI module 190 processes the IPMI messages to generate data recognizable by the firmware 126, and then sends the data back to the firmware 126 for further process. In certain embodiments, the IPMI module 190 can be a similar program to the IPMI application 160 at the host computer 110.

Currently, almost all firmware of BMC's available in the market supports the IPMI architecture, and provide a variety of IPMI modules 190. In certain embodiments, the IPMI module 190 can be a part of the firmware 126, which is compatible to the IPMI architecture for generating IPMI messages. In certain embodiments, the IPMI module 190 is separated from the firmware 126 as an independent program.

As discussed above, the IPMI module 190 performs conversion between IPMI messages and data recognizable by the firmware 126. In certain embodiments, the IPMI module 190 is independent from the USB features of the BMC 120. Thus, the IPMI module 190 does not need to change the codes or software modules to be compatible to the USB standard. In other words, the IPMI module 190 may maintain its original IPMI processing functionalities without adding features compatible to the USB standard.

The IPMI messages can be transmitted, translated, bussed, and wrapped in a variety of fashions. Generally, an IPMI message can be a request message (generally labeled as "rq") or a response message (generally labeled as "rs"), and has a plurality of fields, including the network function (NetFn) field, the logical unit number (LUN) field, the sequence number (Seq#) field, the command (CMD) field, and the data field.

The NetFn field is a six-bit field that describes the network function of the IPMI message. The IPMI Specification defines certain predefined categories for the NetFn field, and there are reserved codes for OEM expansion. For a request message, the NetFn field is an odd number, and for a response message, the NetFn field is an even number.

The LUN field is a two-digit logical unit number for sub-addressing purposes. For low-end integrity servers and computers, the LUN field is always zero.

The Seq# field defines a sequence number in the response message to identify the response message in response to a certain request message. In certain embodiments, the value stored in the Seq# field is the same number as the sequence number appeared in the CMD field of the request message to which the response message is in response. As discussed above, the Seq# field must be provided when the NetFn field is an even number to indicate the IPMI message as a response message.

The CMD field includes the commands of the IPMI message. When the IPMI message is a request message, the CMD field includes a sequence number such that a response message to the request message may include the same sequence number in the Seq# field.

The data field includes all data transferred by the IPMI message. In certain embodiments, the data field of an IPMI message can be 0 bytes. In other words, an IPMI message may contain no data field.

Figure 3A:
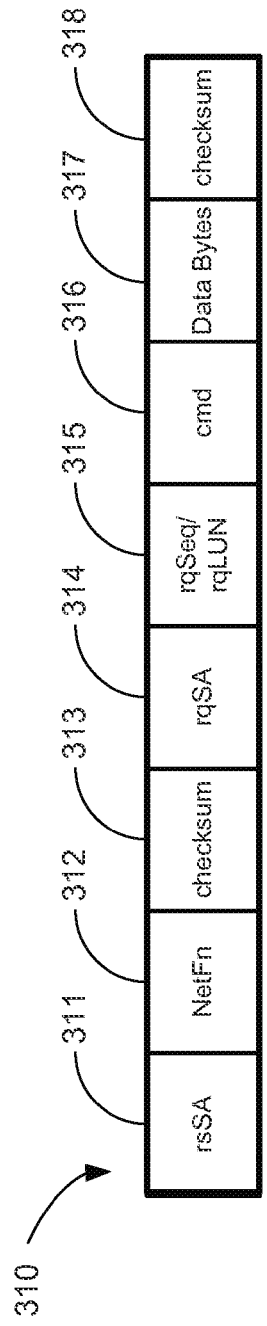
FIG. 3A schematically depicts an IPMI message according to certain embodiments of the present disclosure.

FIG. 3A schematically depicts an IPMI message according to certain embodiments of the present disclosure. As shown in FIG. 3A, the IPMI message 310 includes a plurality of fields, such as the rs slave address (rsSA) field 311, the NetFn field 312, the rq slave address (rqSA) field 314, the rq Seq# (rqSeq)/rqLUN field 315, the command field 316, and the data field 317. Further, a plurality of checksum fields 313 and 318 are included for checksum verification purposes. As discussed above, the data field 317 may contain 0 bytes of data (i.e. no data field) or more than one byte of data.

Figure 3B:
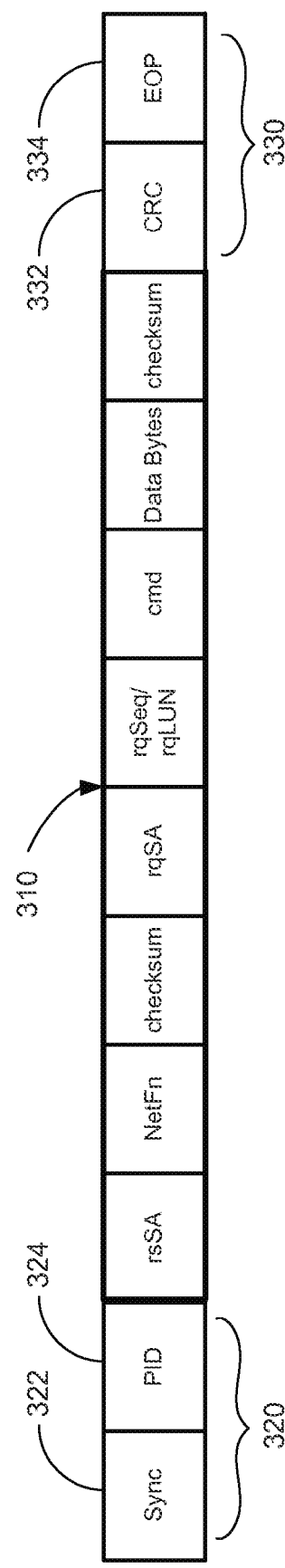
FIG. 3B schematically depicts a USB HID data packet in which an IPMI message is embedded according to certain embodiments of the present disclosure.

FIG. 3B schematically depicts a USB HID data packet in which an IPMI message is embedded according to certain embodiments of the present disclosure. As shown in FIG. 3B, the IPMI message 310 is embedded in a report, which is in the form of a USB data packet. In other words, the USB data packet does not require further conversion from the report to the packets. The format of the report is the predefined format based on the information stored in the report descriptor 260 of the BMC 120. As shown in FIG. 3B, the USB data packet includes a USB header 320 attached at the front of the IPMI message 310, the IPMI message 310, and a USB footer 330 attached at the end of the IPMI message 310.

In certain embodiments, the USB header 320 includes a synchronization (Sync) field 322 and a packet identifier (PID) field 324. The Sync field 322 is an 8-bit (slow or full speed USB) or 32-bit (high speed USB) field used for synchronize the transmitter and the receiver such that the data can be transferred accurately. The PID field 324 is an 8-bit identifier directly following the Sync Field 322, which includes 4 bits of identifiers and 4 bits of compliments of the identifier.

In certain embodiments, the USB footer 330 includes a cyclic redundancy checking (CRC) field 332 and an end of packet (EOP) field 334. The CRC field 332 can be a 16-bit CRC16 error detection field used for CRC purposes. The EOP field 334 is a 3-bit packet ending field, including a single ended zero (SE0) for two bits followed by a J for 1 bit.

As discussed above, data transfer under the HID class completely satisfies the requirements specified by IPMI v2.0, and the maximum packet size rate under the HID class is faster than the byte-level data transfer via the typical standardized IPMI system interfaces. Thus, by converting IPMI message to the report, IPMI messages can be transferred between the host computer 110 and the BMC 120 through the USB interface 130.

FIG. 4 schematically depicts configuration setup of the BMC as a specific HID device at a host computer according to certain embodiments of the present disclosure.

When the BMC 120 is connected to the host computer 110 via the USB interface 130, the OS 140 detects that a device is connected to the host computer 110 via the USB interface 130, but does not know at this time whether the device is a HID device or any other USB devices. To determine the type of the BMC 120, at procedure 510, the OS 140 instructs the USB HID host driver 150 to access the descriptors of the device. In certain embodiments, the OS 140 accesses one descriptor at a time. At procedure 520, the USB HID host driver 150 sends a Get_Descriptor request to the BMC 120 through the USB interface 130 to get a device descriptor 210.

At the BMC 120, when the USB HID device driver 180 receives the Get_Descriptor request for the device descriptor 210, at procedure 430, the USB HID device driver 180 send a request to the USB descriptors 170 for the device descriptor 210. In response, at procedure 440, the USB descriptors 170 return the device descriptor 210 back to the USB HID device driver 180. At procedure 450, the USB HID device driver 180 converts the device descriptor 210 to USB data packets, and at procedure 460, the USB HID device driver 180 sends the USB data packets to the host computer 110 through the USB interface 130.

At the host computer 110, when the USB HID host driver 150 receives the USB data packets, at procedure 470, the USB HID host driver 150 converts the USB data packets back to the device descriptor 210. At procedure 480, the USB HID host driver 150 sends the device descriptor 210 to the OS 140. At procedure 490, the OS 140 reads the device descriptor 210, and recognizes that the device descriptor 210 has one corresponding configuration descriptor 220.

At procedure 495, the OS 140 goes back to procedure 410 to request for the configuration descriptor 220. The same requesting and interpreting procedures from 310 to 390 repeats until the OS 140 of the host computer 110 reads all of the descriptors (including the device descriptor 210, the configuration descriptor 220, the interface descriptor 230, the endpoint descriptor 240, the HID descriptor 250, and the report descriptor 260) from the USB descriptors 170 of the BMC 120. Once the OS 140 reads all of the descriptors, the USB connection between the host computer 110 and the BMC 120 is fully established.

In certain embodiments, when the OS 140 reads the interface descriptor 230, the OS 140 can determine from the value (0x03) of the bInterfaceClass field 232 in the interface descriptor 230 that the BMC 120 is a HID device. When the OS 140 reads the report descriptor 260, the OS 140 determines from the format codes 262 of the report descriptor 260 that the report being transferred between the host computer 110 and the BMC 120 may include a packet header, an IPMI message, and a packet footer. During the USB connection, the host computer 110 may send a standard request to the BMC 120 to get or change the information of the USB descriptors 170 from the BMC 120. For example, the host computer 110 may send a Get_Descriptor request to the BMC 120 to get any of the descriptors from the USB descriptors 170 of the BMC 120. In certain embodiments, the host computer 110 may issue a Set_Descriptor request to the BMC 120 to change the information in any of the descriptors of the USB descriptors 170 of the BMC 120.

Figure 5:
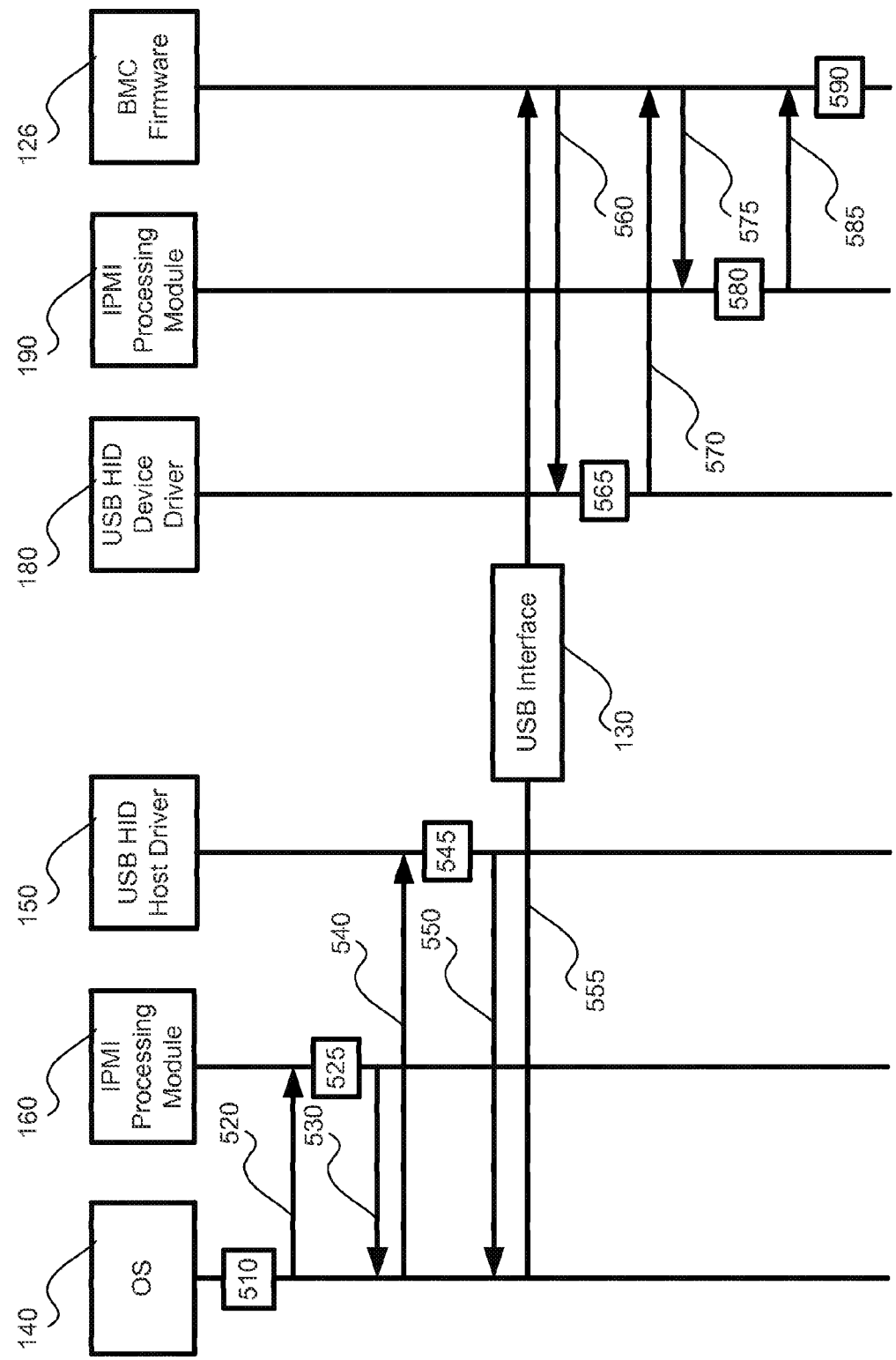
FIG. 5 schematically depicts data transfer from the host computer to the BMC according to certain embodiments of the present disclosure.

FIG. 5 schematically depicts data transfer from the host computer to the BMC according to certain embodiments of the present disclosure. In certain embodiments, reports, which are in the predefined format according to the format codes 262, are transferred from the host computer 110 to the BMC 120. In other words, the host computer 110, which initiates the data transfer process, is a source device, and the BMC 120, which receives the data being transferred, is the target device.

At procedure 510, the OS 140 generates certain data to be sent to the BMC 120. In certain embodiments, the data can include any information to be used by the BMC 120, such as a command, an instruction, a response to a request from the BMC 120, or any other data. It should be noted that the data is not in the format of an IPMI message. To generate the IPMI message, at procedure 520, the OS 140 sends the data to the IPMI application 160. At procedure 525, the IPMI application 160 converts the data to generate the IPMI message. An example of the IPMI message 310 is shown in FIG. 3A. At procedure 530, the IPMI application 160 sends the IPMI message back to the OS 140.

As discussed above, during the configuration of the BMC 120 as a USB HID device, the OS 140 of the host computer 110 determines, based on the format codes 262 of the report descriptor 260, that data transfer between the BMC 120 and the host computer 110 should be a report in the predefined format. To send the IPMI message to the BMC 120, at procedure 540, the OS 140 sends the IPMI messages to the USB HID host driver 150, and instructs the USB HID host driver 150 to generate a report in the predefined format.

At procedure 545, the USB HID host driver 150 embeds the IPMI message in the report based on the predefined format, and generates USB data packets of the report. In certain embodiments, the report includes one USB data packet. In certain embodiments, the USB data packet includes the packet header 320, the IPMI message 310, and the packet footer 330 as shown in FIG. 3B. At procedure 550, the USB HID host driver 150 sends the USB data packets back to the OS 140.

At procedure 555, the OS 140 sends the USB data packets to the BMC 120 through the USB interface 130. In certain embodiments, the maximum packet size of endpoint zero of the BMC 120, which is defined in the bMaxPacketSize0 field of the device descriptor 210, can be 64 bytes.

At the BMC 120, when the firmware 126 receives the USB data packets from the host computer 110, at procedure 560, the firmware 126 sends the USB data packets to the USB HID device driver 180 for converting the USB data packets back to the report and retrieving the IPMI message embedded in the report. At procedure 565, the USB HID device driver 180 combines the USB data packets to generate the report, and retrieves the data embedded in the report according to the predefined format. Since the data embedded in the report is the IPMI message, the retrieved data will be the IPMI message generated at the host computer 110. At procedure 570, the USB HID device driver 180 sends the retrieved IPMI message to the firmware 126.

At procedure 575, the firmware 126 sends the IPMI message to the IPMI module 190. At procedure 580, the IPMI module 190 converts the IPMI message to data recognizable by the firmware 126. At procedure 585, the IPMI module 190 sends the data back to the firmware 126. At procedure 590, the firmware 126 may process with the data.

As discussed above, the conversion between original data and the IPMI message is performed by the IPMI application 160 at the host computer 110 and the IPMI module 190 at the BMC 120. The conversion between the IPMI messages and the report is performed by the USB HID host driver 150 at the host computer 110 and the USB HID device driver 180 at the BMC 120. Thus, at the host computer 110, the IPMI application 160 may maintain its original IPMI processing functionalities without changing the codes or software modules to be compatible to the USB standard, and the USB HID host driver 150 may maintain its original USB processing functionalities without changing the codes or software modules to be compatible to the IPMI architecture. At the BMC 120, the IPMI module 190 may maintain its original IPMI processing functionalities without changing the codes or firmware modules to be compatible to the USB standard, and the USB HID device driver 180 may maintain its original USB processing functionalities without changing the codes or software modules to be compatible to the IPMI architecture.

Figure 6:
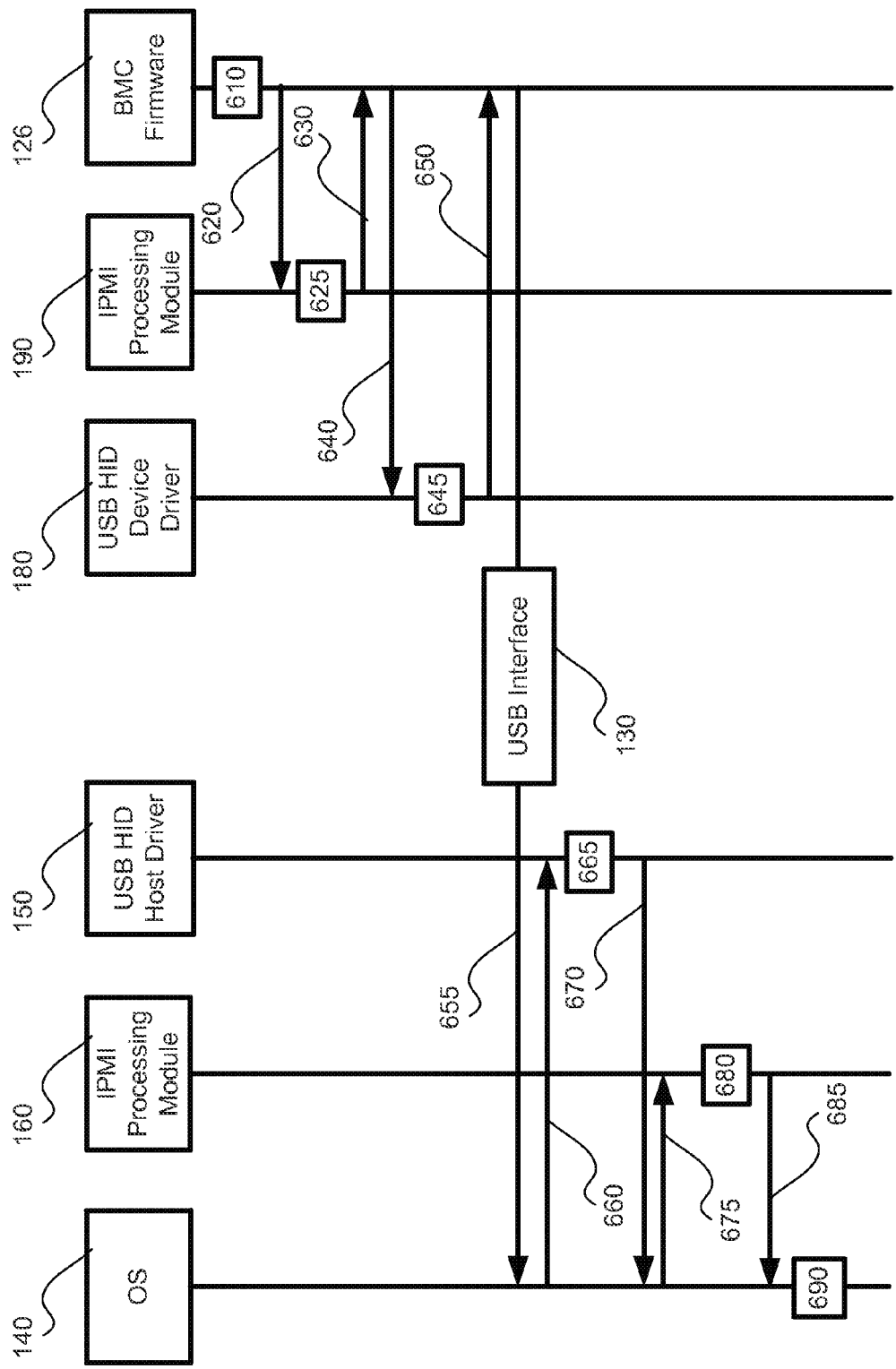
FIG. 6 schematically depicts data transfer from the BMC to the host computer according to certain embodiments of the present disclosure.

FIG. 6 schematically depicts data transfer from the BMC to the host computer according to certain embodiments of the present disclosure. In certain embodiments, reports, which are in the predefined format according to the format codes 262, are transferred from the BMC 120 to the host computer 110. In other words, the BMC 120, which initiates the data transfer process, is the source device, and the host computer 110, which receives the data being transferred, is the target device. As discussed above, USB 3.0 allows for device-initiated communications towards the host. Thus, the data transfer process from the BMC 120 to the host computer 110 can be initiated by the BMC 120, which is similar to the data transfer process from the host computer 110 to the BMC 120 as shown in FIG. 5.

At procedure 610, the firmware 126 generates certain data to be sent to the host computer 110. In certain embodiments, the data can include any information to be used by the host computer 110, such as a command, an instruction, a response to a request from the host computer 110, or any other data. It should be noted that the data is not in the format of an IPMI message. To generate the IPMI message, at procedure 620, the firmware 126 sends the data to the IPMI module 190. At procedure 625, the IPMI module 190 converts the data to generate the IPMI message. An example of the IPMI message 310 is shown in FIG. 3A. At procedure 630, the IPMI module 190 sends the IPMI message back to the firmware 126.

As discussed above, data transfer between the BMC 120 and the host computer 110 is a report in the predefined format. To send the IPMI message to the host computer 110, at procedure 640, the firmware 126 sends the IPMI messages to the USB HID device driver 180, and instructs the USB HID device driver 180 to generate a report in the predefined format.

At procedure 645, the USB HID device driver 180 embeds the IPMI message in the report based on the predefined format, and generates USB data packets of the report. In certain embodiments, the report includes one USB data packet. In certain embodiments, the USB data packet includes the packet header 320, the IPMI message 310, and the packet footer 330 as shown in FIG. 3B. At procedure 650, the USB HID device driver 180 sends the USB data packets back to the firmware 126. At procedure 655, the firmware 126 sends the USB data packets to the host computer 110 through the USB interface 130.

At the host computer 110, when the OS 140 receives the USB data packets from the BMC 120, at procedure 660, the firmware 126 sends the USB data packets to the USB HID host driver 150 for converting the USB data packets back to the report and retrieving the IPMI message embedded in the report. At procedure 665, the USB HID host driver 150 combines the USB data packets to generate the report, and retrieves the data embedded in the report according to the predefined format. Since the data embedded in the report is the IPMI message, the retrieved data will be the IPMI message generated at the BMC 120. At procedure 670, the USB HID host driver 150 sends the retrieved IPMI message to the OS 140.

At procedure 675, the OS 140 sends the IPMI message to the IPMI application 160. At procedure 680, the IPMI application 160 converts the IPMI message to data recognizable by the OS 140. At procedure 685, the IPMI application 160 sends the data back to the OS 140. At procedure 690, the OS 140 may process with the data.

As discussed above, the conversion between original data and the IPMI message is performed by the IPMI application 160 at the host computer 110 and the IPMI module 190 at the BMC 120. The conversion between the IPMI messages and the report is performed by the USB HID host driver 150 at the host computer 110 and the USB HID device driver 180 at the BMC 120. Thus, at the host computer 110, the IPMI application 160 may maintain its original IPMI processing functionalities without changing the codes or software modules to be compatible to the USB standard, and the USB HID host driver 150 may maintain its original USB processing functionalities without changing the codes or software modules to be compatible to the IPMI architecture. At the BMC 120, the IPMI module 190 may maintain its original IPMI processing functionalities without changing the codes or firmware modules to be compatible to the USB standard, and the USB HID device driver 180 may maintain its original USB processing functionalities without changing the codes or software modules to be compatible to the IPMI architecture.

The system and methods as described in the embodiments of the present disclosure relate to data transfer between the host computer 110 and the BMC 120 through the USB interface 130. The data being transferred includes IPMI messages embedded in the USB HID reports. This allows data transfer to be performed through the USB interface 130. Thus, a low cost BMC 120 without hardware/software support to the standardized IPMI system interfaces may utilize the methods as described in the embodiments to perform IPMI over USB data transfer through the USB interface 130. In other words, the system and methods as described in the embodiments may be implemented in any BMC or SP connected to the host computer 110 with a USB interface 130 even if there is no standardized IPMI system interface available.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
 a baseboard management controller (BMC), comprising a processor, a non-volatile memory and a universal serial bus (USB) interface, wherein the non-volatile stores firmware, a plurality of USB descriptors, and a USB human interface device (HID) device driver, wherein the firmware, when executed at the processor, is configured to
 when the BMC is connected to a host computer via the USB interface, send the plurality of USB descriptors to the host computer through the USB interface such that the host computer recognizes the BMC as a specific HID device based on the plurality of USB descriptors;

instruct the USB HID device driver to generate a first USB HID report in a predefined format based on the USB descriptors, wherein the predefined format comprises a USB header, report data, and a USB footer;

generate a first Intelligent Platform Management Interface (IPMI) message as the report data of the first USB HID report;

send the first USB HID report generated by the USB HID device driver to the host computer through the USB interface;

receive a second USB HID report in the predefined format from the host computer through the USB interface;

instruct the USB HID device driver to retrieve the report data from the second USB HID report, wherein the retrieved report data is a second IPMI message; and process the second IPMI message.

2. The system as claimed in claim 1, wherein the USB header comprises a synchronization field and a packet identifier field, and the USB footer comprises a cyclic redundancy checking (CRC) field and an end of packet (EOP) field.

3. The system as claimed in claim 1, wherein each of the first USB HID report and the second USB HID report comprises at least one USB data packet.

4. The system as claimed in claim 1, wherein the firmware is configured to send the plurality of USB descriptors to the host computer through the USB interface by receiving a request for one of the USB descriptors from the host computer through the USB interface; and sending, in response to the request, the requested USB descriptor to the host computer through the USB interface.

5. The system as claimed in claim 1, wherein the firmware is configured to receive the second USB HID report from the host computer through the USB interface by receiving at least one USB data packet of the second USB HID report from the host computer through the USB interface; and instructing the USB HID device driver to combine the at least one USB data packet to generate the second USB HID report.

6. The system as claimed in claim 1, wherein the firmware is configured to send the first USB HID report to the host computer through the USB interface by instructing the USB HID device driver to generate at least one USB data packet from the first USB HID report; and send the at least one USB data packet of the first USB HID report to the host computer through the USB interface.

7. The system as claimed in claim 1, wherein the host computer comprises:

a host processor; and a storage device, configured to store an IPMI application, an operating system (OS), and a USB HID host driver, wherein the IPMI application, when executed at the host processor, is configured to generate the second IPMI message as the report data of the second USB HID report;

send the second IPMI message to the OS; and receive and process the first IPMI message from the OS;

wherein the OS, when executed at the host processor, is configured to when the BMC is connected to the host computer via the USB interface, receive the plurality of USB descriptors from the BMC through the USB interface, and recognize the BMC as the specific HID device to receive the second USB HID report based on the plurality of USB descriptors;

receive the second IPMI message from the IPMI application;

instruct the USB HID host driver to generate the second USB HID report from the second IPMI message in the predefined format based on the plurality of USB descriptors;

send the second USB HID report generated by the USB HID host driver to the BMC through the USB interface;

receive the first USB HID report from the BMC through the USB interface; and instruct the USB HID host driver to retrieve the first IPMI message from the first USB HID report and send the retrieved first IPMI message to the IPMI application.

8. The system as claimed in claim 7, wherein the OS is configured to receive the plurality of USB descriptors to the host computer through the USB interface by sending a request for one of the USB descriptors to the BMC through the USB interface; and receiving the requested USB descriptor from the BMC through the USB interface.

9. The system as claimed in claim 7, wherein the USB descriptors comprise a device descriptor, at least one configuration descriptor, at least one interface descriptor, at least one endpoint descriptor, at least one HID descriptor, and at least one report descriptor.

10. The system as claimed in claim 9, wherein the at least one interface descriptor comprises a USB HID class code identifying the BMC as the specific HID device, and wherein the at least one report descriptor comprises format codes identifying the predefined format.

11. The system as claimed in claim 10, wherein the OS is configured to recognize the BMC as the specific HID device by identifying the BMC as the specific HID device based on the USB HID class code of the at least one interface descriptor; and identifying the predefined format based on the format codes of the at least one report descriptor.

12. The system as claimed in claim 7, wherein the OS is configured to receive the first USB HID report from the BMC through the USB interface by receiving at least one USB data packet of the first USB HID report from the BMC through the USB interface; and instructing the USB HID host driver to combine the at least one USB data packet to generate the first USB HID report.

13. The system as claimed in claim 7, wherein the OS is configured to send the second USB HID report to the BMC through the USB interface by instructing the USB HID host driver to generate at least one USB data packet from the second USB HID report; and send the at least one USB data packet of the second USB HID report to the host computer through the USB interface.

14. A method of transferring data between a baseboard management controller (BMC) and a host computer, comprising:

sending, from the BMC, a plurality of universal serial bus (USB) descriptors to the host computer through a USB interface such that the host computer recognizes the BMC as a specific human interface device (HID) device based on the plurality of USB descriptors, wherein the BMC is connected to the host computer via the USB interface;

instructing, at the BMC, a USB HID device driver to generate a first USB HID report in a predefined format based on the USB descriptors, wherein the predefined format comprises a USB header, report data, and a USB footer;

generating, at the BMC, a first Intelligent Platform Management Interface (IPMI) message as the report data of the first USB HID report;

sending, from the BMC, the first USB HID report generated by the USB HID device driver to the host computer through the USB interface;

receiving, at the BMC, a second USB HID report in the predefined format from the host computer through the USB interface;

instructing, at the BMC, the USB HID device driver to retrieve the report data from the second USB HID report, wherein the retrieved report data is a second IPMI message; and processing, at the BMC, the second IPMI message.

15. The method as claimed in claim 14, wherein each of the first USB HID report and the second USB HID report comprises at least one USB data packet.

16. The method as claimed in claim 14,
wherein the BMC is configured to send the plurality of USB descriptors to the host computer through the USB interface by
receiving a request for one of the USB descriptors from the host computer through the USB interface; and
sending, in response to the request, the requested USB descriptor to the host computer through the USB interface;
wherein the BMC is configured to receive the second USB HID report from the host computer through the USB interface by
receiving at least one USB data packet of the second USB HID report from the host computer through the USB interface; and
instructing the USB HID device driver to combine the at least one USB data packet to generate the second USB HID report; and
wherein the BMC is configured to send the first USB HID report to the host computer through the USB interface by instructing the USB HID device driver to
generate at least one USB data packet from the first USB HID report; and
send the at least one USB data packet of the first USB HID report to the host computer through the USB interface.

17. The method as claimed in claim 14, wherein the host computer comprises:
a host processor; and
a storage device, configured to store an IPMI application, an operating system (OS), and a USB HID host driver,
wherein the IPMI application, when executed at the host processor, is configured to
generate the second IPMI message as the report data of the second USB HID report;
send the second IPMI message to the OS; and
receive and process the first IPMI message from the OS;
wherein the OS, when executed at the host processor, is configured to when the BMC is connected to the host computer via the USB interface, receive the plurality of USB descriptors from the BMC through the USB interface, and recognize the BMC as the specific HID device to receive the second USB HID report based on the plurality of USB descriptors;
receive the second IPMI message from the IPMI application;
instruct the USB HID host driver to generate the second USB HID report from the second IPMI message in the predefined format based on the plurality of USB descriptors;
send the second USB HID report generated by the USB HID host driver to the BMC through the USB interface;
receive the first USB HID report from the BMC through the USB interface; and
instruct the USB HID host driver to retrieve the first IPMI message from the first USB HID report and send the retrieved first IPMI message to the IPMI application.

18. The method as claimed in claim 17, wherein the USB descriptors comprise a device descriptor, at least one configuration descriptor, at least one interface descriptor, at least one endpoint descriptor, at least one HID descriptor, and at least one report descriptor,
wherein the at least one interface descriptor comprises a USB HID class code identifying the BMC as the specific HID device, and wherein the at least one report descriptor comprises format codes identifying the predefined format.

19. The method as claimed in claim 18,
wherein the OS is configured to receive the plurality of USB descriptors to the host computer through the USB interface by
sending a request for one of the USB descriptors to the BMC through the USB interface; and
receiving the requested USB descriptor from the BMC through the USB interface;
wherein the OS is configured to recognize the BMC as the specific HID device by
identifying the BMC as the specific HID device based on the USB HID class code of the at least one interface descriptor; and
identifying the predefined format based on the format codes of the at least one report descriptor;
wherein the OS is configured to receive the first USB HID report from the BMC through the USB interface by
receiving at least one USB data packet of the first USB HID report from the BMC through the USB interface; and
instructing the USB HID host driver to combine the at least one USB data packet to generate the first USB HID report; and
wherein the OS is configured to send the second USB HID report to the BMC through the USB interface by instructing the USB HID host driver to
generate at least one USB data packet from the second USB HID report; and
send the at least one USB data packet of the second USB HID report to the host computer through the USB interface.

20. A non-transitory computer readable medium storing computer executable codes, wherein the codes, when executed at a processor, are configured to
send, from a baseboard management controller (BMC), a plurality of universal serial bus (USB) descriptors to a host computer through a USB interface such that the host computer recognizes the BMC as a specific human interface device (HID) device based on the plurality of USB descriptors, wherein the BMC is connected to the host computer via the USB interface;

instruct, at the BMC, a USB HID device driver to generate a first USB HID report in a predefined format based on the USB descriptors, wherein the predefined format comprises a USB header, report data, and a USB footer;

generate, at the BMC, a first Intelligent Platform Management Interface (IPMI) message as the report data of the first USB HID report;

send, from the BMC, the first USB HID report generated by the USB HID device driver to the host computer through the USB interface;

receive, at the BMC, a second USB HID report in the predefined format from the host computer through the USB interface;

instruct, at the BMC, the USB HID device driver to retrieve the report data from the second USB HID report, wherein the retrieved report data is a second IPMI message; and process, at the BMC, the second IPMI message.

21. The non-transitory computer readable medium as claimed in claim 20, wherein each of the first USB HID report and the second USB HID report comprises at least one USB data packet.

22. The non-transitory computer readable medium as claimed in claim 20,
wherein the codes are configured to send, from the BMC, the plurality of USB descriptors to the host computer through the USB interface by
receiving a request for one of the USB descriptors from the host computer through the USB interface; and
sending, in response to the request, the requested USB descriptor to the host computer through the USB interface;
wherein the codes are configured to receive, at the BMC, the second USB HID report from the host computer through the USB interface by
receiving at least one USB data packet of the second USB HID report from the host computer through the USB interface; and
instructing the USB HID device driver to combine the at least one USB data packet to generate the second USB HID report; and
wherein the codes are configured to send, from the BMC, the first USB HID report to the host computer through the USB interface by instructing the USB HID device driver to
generate at least one USB data packet from the first USB HID report; and
send the at least one USB data packet of the first USB HID report to the host computer through the USB interface.

23. The non-transitory computer readable medium as claimed in claim 20, wherein the host computer comprises:
a host processor; and
a storage device, configured to store an IPMI application, an operating system (OS), and a USB HID host driver, wherein the IPMI application, when executed at the host processor, is configured to
generate the second IPMI message as the report data of the second USB HID report;
send the second IPMI message to the OS; and receive and process the first IPMI message from the OS;
wherein the OS, when executed at the host processor, is configured to
when the BMC is connected to the host computer via the USB interface, receive the plurality of USB descriptors from the BMC through the USB interface, and recognize the BMC as the specific HID device to receive the second USB HID report based on the plurality of USB descriptors;
receive the second IPMI message from the IPMI application;
instruct the USB HID host driver to generate the second USB HID report from the second IPMI message in the predefined format based on the plurality of USB descriptors;
send the second USB HID report generated by the USB HID host driver to the BMC through the USB interface;
receive the first USB HID report from the BMC through the USB interface; and
instruct the USB HID host driver to retrieve the first IPMI message from the first USB HID report and send the retrieved first IPMI message to the IPMI application.

24. The non-transitory computer readable medium as claimed in claim 23, wherein the USB descriptors comprise a device descriptor, at least one configuration descriptor, at least one interface descriptor, at least one endpoint descriptor, at least one HID descriptor, and at least one report descriptor,
wherein the at least one interface descriptor comprises a USB HID class code identifying the BMC as the specific HID device, and wherein the at least one report descriptor comprises format codes identifying the predefined format.

25. The non-transitory computer readable medium as claimed in claim 24,
wherein the OS is configured to receive the plurality of USB descriptors to the host computer through the USB interface by
sending a request for one of the USB descriptors to the BMC through the USB interface; and
receiving the requested USB descriptor from the BMC through the USB interface;
wherein the OS is configured to recognize the BMC as the specific HID device by
identifying the BMC as the specific HID device based on the USB HID class code of the at least one interface descriptor; and
identifying the predefined format based on the format codes of the at least one report descriptor;
wherein the OS is configured to receive the first USB HID report from the BMC through the USB interface by
receiving at least one USB data packet of the first USB HID report from the BMC through the USB interface; and
instructing the USB HID host driver to combine the at least one USB data packet to generate the first USB HID report; and
wherein the OS is configured to send the second USB HID report to the BMC through the USB interface by instructing the USB HID host driver to
generate at least one USB data packet from the second USB HID report; and
send the at least one USB data packet of the second USB HID report to the host computer through the USB interface.

* * * * *